Patented Apr. 24, 1934

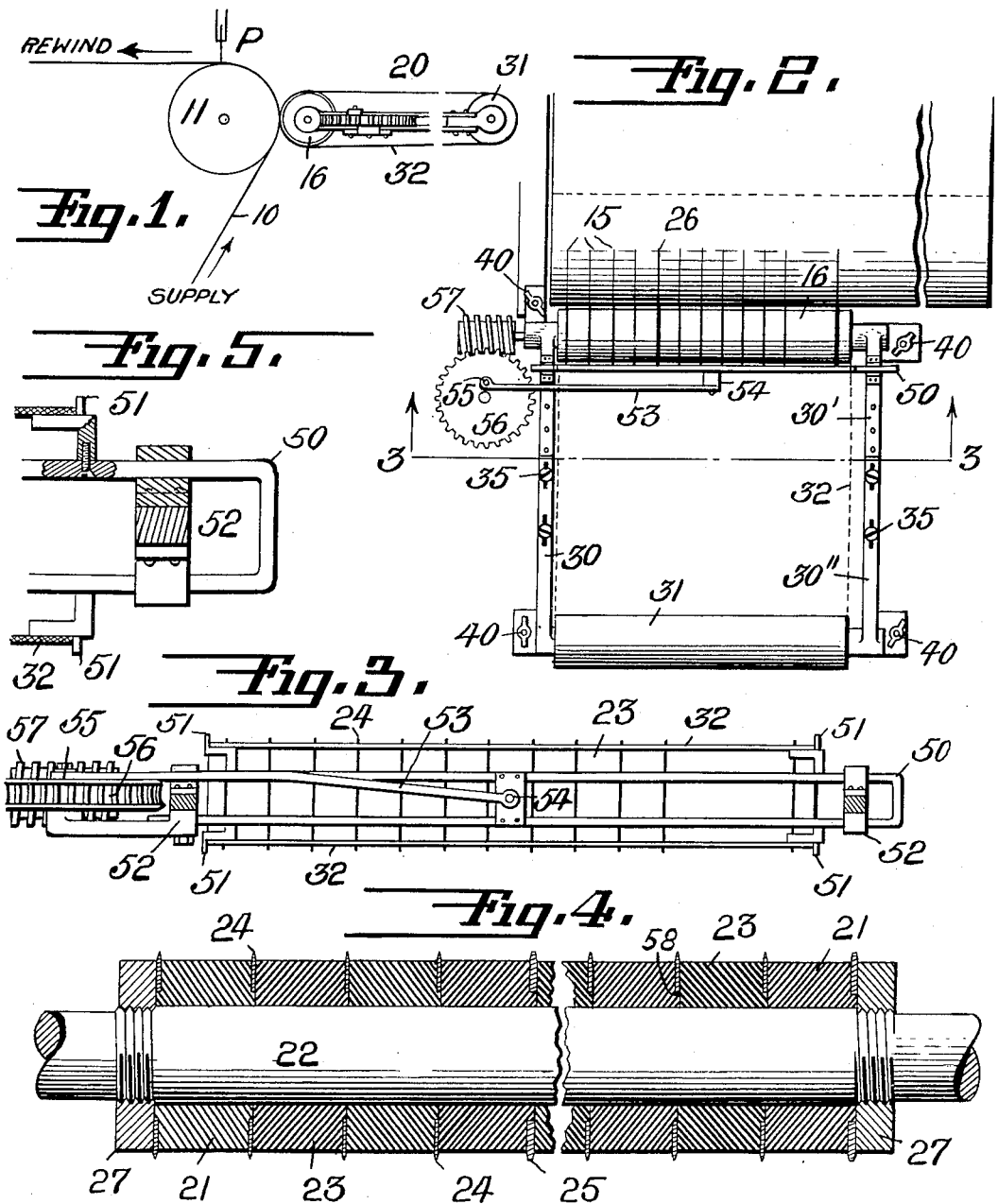

1,955,944

UNITED STATES PATENT OFFICE 1,955,944

RULING DEVICE

Leslie F. Carter, Leonia, N. J., assignor, by mesne assignments, to Sperry Products, Inc., Brooklyn, N. Y., a corporation of New York Application May 20, 1929, Serial No. 364,451

14 Claims. (Cl. 33—37)

This invention relates to marking or ruling devices adapted to be employed in connection with recording devices, and more specifically applying to that form of recorder which employs a chart having a plurality of baselines marked thereon. Heretofore it has been customary to provide means for impressing or otherwise ruling such baselines on the chart either before the chart was placed in position or during the feeding of the chart, the said ruling action taking place at a point remote from the position of the marker. It has been found that in either of the preceding cases a certain amount of creepage invariably took place between the point of supply or point of ruling of the baselines and the recording pen or pens; so that the said base or reference lines no longer properly indicated the desired reference points. This introduced an error into the record as made by the pen on the chart. It is the principal object of my invention, therefore, to provide means for ruling base or reference lines upon a chart closely adjacent to the point or points where the record is made so that there is practically no opportunity for creepage of the chart between the point where the reference lines are ruled and the point where the record is made.

It is a further object of my invention to employ, for the purpose hereinbefore mentioned, a carbon ribbon adapted to be pressed into engagement with the chart at one or more points to form reference lines, and to provide means whereby the entire width of the carbon ribbon will be utilized and not merely those points where the lines are ruled.

It is a further object of my invention to provide means for pressing the carbon ribbon into engagement with the recording chart for the purpose of ruling the said reference lines and which will provide positive pressure and at the same time allow for variations in thickness of chart and for other irregularities.

It is a further object of my invention to provide a ruling device of the type described which can be readily attached to or detached from any ordinary form of recorder, and which is further designed so that the carbon ribbon may be easily withdrawn therefrom to permit a new ribbon to be placed thereon.

Still further objects and advantages of my invention will become apparent in the following detailed description thereof.

In the accompanying drawing,

Fig. 1 is a side view somewhat diagrammatic showing the relative positions of a portion of the recording mechanism and my ruling device.

Fig. 2 is a plan view with somewhat greater detail of the Fig. 1 form of the invention.

Fig. 3 is a vertical section taken substantially on the line 3—3 of Fig. 2 and disclosing an enlarged view of the means for oscillating the ribbon.

Fig. 4 is a partly vertical section through the ruling roller.

Fig. 5 is a view of the end portion of Fig. 3 partly sectioned vertically.

Referring to Fig. 1 of the drawing, the theory of my invention will be found illustrated therein. A chart 10 is shown as coming from a supply roll (not shown) and after passing over a supporting or guide roller 11 is wound upon a rewind roller (not shown). A pen P is adapted to make a record upon said chart preferably at a point normal to the roller 11, although said pen may mark upon said chart at any other point. The ruling device indicated generally by the numeral 20 is adapted to rule upon said chart 10 a series of reference lines 15 (see Fig. 2) with which the said pen P cooperates to give a record. It will be seen that the ruling device 20 has a ruling roller 16 closely adjacent the point where pen P makes the record, so that in the very short distance which the chart 10 traverses between the point where roller 16 rules the reference lines and the point where pen P makes the record no appreciable lateral creepage of the chart 10 is possible under ordinary operating conditions. The pen P being adjusted to bear a definite initial relation to the said reference lines will, therefore, maintain said relation at all times with no possibility of error due to the lateral creepage of the chart 10, which is invariably the case when the said ruling of reference lines takes place at a point remote from the recording position or where said lines are ruled before the roll is placed in position.

The details of the roller 16 are disclosed in Fig. 4, in which figure it will be seen that the said roller may be formed of a sleeve 21 of soft rubber mounted upon a shaft 22 which may be of steel. The said sleeve 21 may be composed of a plurality of sections 23 between each two of which is provided a disc or ring 24 preferably of metal having a relatively sharp outer edge which presses upon the carbon ribbon to form the marking or reference line shown in Fig. 2. Certain of said rings, such as ring 25, may be provided with a broader ruling face than the remaining rings to form a distinguishing reference line, such as line 26 in Fig. 2. The rings are preferably seated upon shoulders 58 formed within each section 23 on the end thereof so that the said rings may yield radially to take up variations in the thickness of the chart and any other irregularities in said radial direction. All of the sections 23 and the rings 24 are clamped between the sections, so as to be embedded in the roller, locked together to form a solid sleeve by means of locking nuts 27 threaded upon the ends of shaft 22.

Said roller may be mounted within a frame 30 at the forward end thereof, said frame having a rear roller 31 and a carbon ribbon 32 in the form of an endless band extending around said rollers. The said frame 30 may be composed of two relatively slidable parts 30' and 30'' which may be slid together after loosening screws 35, to permit the said carbon ribbon to be slipped over the rollers or to be removed therefrom. The said frame 30 may be mounted in position adjacent the recorder by means of clamping screws 40 engaging fixed standards. The supporting means for frame 30 are such that when the frame 30 is mounted in position and clamped by means of clamp 40, the front roller, that is the ruling roller 16 of the ruling mechanism, will engage the roller 11 with a certain predetermined pressure.

Where the marks to be ruled upon the chart take the form of relatively thin reference lines, such as 15, or the somewhat wider lines 26, it will be seen that said lines utilize but a small portion of the total width of the carbon ribbon and that normally said lines would always be ruled through the very same portions of the carbon ribbon, which would soon wear out, while the spaces between the lines on said ribbon would be practically unused. To avoid such a condition and to utilize evenly the entire surface of the carbon ribbon, I provide means for oscillating said ribbon laterally the distance equal to the distance between two adjacent lines 15. This means may take the form of an oscillator 50 provided with fingers 51 adapted to engage the edges of the ribbon, preferably both above and below, the said frame 50 being slidably supported within fixed brackets 52. For oscillating the said frame 50 and hence oscillating the ribbon, I may provide a crank arm 53 pivoted to frame 50 at 54 and pivoted at 55 upon a crank gear wheel 56. The said gear wheel may be driven continuously as long as the chart 10 is fed by taking the drive of said chart in the following manner. The roller 11 rotates as the chart is fed and drives roller 16 in the opposite direction. The shaft 22 of said roller 16 may be provided with a worm 57 adapted to engage the wormwheel 56 to drive said wheel continuously and hence oscillate frame 50 and the carbon ribbon continuously as long as chart 10 is fed.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A ruling mechanism for a recording device, said device including a sheet adapted to have reference markings ruled thereon and means for making a record on the sheet, said ruling mechanism including a marking ribbon, ruling means, and means including said ruling means whereby said ribbon is pressed into engagement with said sheet.

2. A ruling mechanism for a recording device, said device including a sheet adapted to have reference markings ruled thereon, means for moving said sheet and means for making a record upon the sheet, said ruling mechanism including a marking ribbon, means whereby said ribbon is pressed into engagement with said sheet, and means whereby said ribbon is fed by the travel of the sheet.

3. A ruling mechanism for a recording device, said device including a sheet adapted to have reference markings ruled thereon, means for moving said sheet and means for making a record upon the sheet, said ruling mechanism including a marking ribbon, means whereby said ribbon is pressed into engagement with said sheet, whereby said ribbon is fed by the travel of the sheet, and means whereby said ribbon is oscillated laterally.

4. A ruling mechanism for a recording device, said device including a sheet adapted to have reference markings ruled thereon, means for moving said sheet and means for making a record upon the sheet, said mechanism including a marking ribbon, means whereby said ribbon is pressed into engagement with said sheet, means whereby said ribbon is fed by the travel of the sheet, and means also operated by the travel of the sheet whereby said ribbon is oscillated laterally.

5. A ruling mechanism for a recording device, said device including a sheet adapted to have reference markings ruled thereon, means for moving said sheet and means for making a record upon the sheet, said ruling mechanism including a marking ribbon, a roller having ruling means, and means whereby said roller presses said ribbon into engagement with said sheet whereby said ribbon is fed by the travel of the sheet and said markings ruled on said sheet.

6. A ruling mechanism for a recording device, said device including a sheet adapted to have reference markings ruled thereon, means for moving said sheet and means for making a record upon the sheet, said ruling mechanism including a marking ribbon, a roller having ruling means, means whereby said roller presses said ribbon into engagement with said sheet whereby said ribbon is fed by the travel of the sheet and said markings ruled on said sheet, and means whereby said ribbon is oscillated laterally through a distance equal to the distance between adjacent markings.

7. A ruling mechanism for a recording device, said device including a sheet adapted to have reference markings ruled thereon, means for moving said sheet and means for making a record upon the sheet, said ruling mechanism including a marking ribbon, a roller having ruling means, means whereby said roller presses said ribbon into engagement with said sheet whereby said ribbon is fed by the travel of the sheet and said markings ruled on said sheet, and means operated by the travel of the sheet whereby said ribbon is oscillated laterally through a distance equal to the distance between adjacent markings.

8. A ruling mechanism for a recording device, said device including a sheet adapted to have reference markings ruled thereon, means for moving said sheet and means for making a record upon the sheet, said ruling mechanism including a roller of yieldable material, ruling dies embedded in said material, a marking ribbon, and means whereby said dies press said ribbon into engagement with said sheet.

9. A ruling mechanism for a recording device, said device including a sheet adapted to have reference markings ruled thereon, means for moving said sheet and means for making a record upon the sheet, said ruling mechanism including a frame, a ruling roller carried by said frame, and an endless marking ribbon carried by said frame and passing over said roller, said frame comprising relatively movable parts whereby the size of said frame may be reduced to permit withdrawal of said ribbon.

10. A ruling mechanism for a recording device, said device including a sheet adapted to have reference markings ruled thereon, means for moving said sheet and means for making a record upon the sheet, said ruling mechanism including a marking ribbon, means whereby said ribbon is pressed into engagement with said sheet, whereby said ribbon is fed by the travel of the sheet, and means also operated by the travel of the sheet whereby said ribbon is oscillated laterally with respect to the direction of movement of the sheet, said last named means including a slidable member having means engaging said ribbon at both edges, a crank connected to said member, and means whereby said crank is driven by the travel of said sheet.

11. A ruling mechanism for a recording device, said device including a sheet adapted to have reference markings ruled thereon, means for moving said sheet and means for making a record upon the sheet, said ruling mechanism including a frame, a roller carried by said frame and having ruling means, an endless marking ribbon carried by said frame and passing over said roller, means including said roller whereby said ribbon is fed by the travel of the sheet, and means operated by the travel of the sheet whereby said ribbon is oscillated laterally with respect to the direction of movement of the sheet.

12. A ruling mechanism for a recording device, said device including a sheet adapted to have reference markings ruled thereon, means for moving said sheet and means for making a record upon the sheet, said ruling mechanism including a frame, a roller carried by said frame and having ruling means, an endless marking ribbon carried by said frame and passing over said roller, means including said roller whereby said ribbon is fed by the travel of the sheet and means operated by the travel of the sheet whereby said ribbon is oscillated laterally with respect to the direction of movement of the sheet, said last-named means including a member slidably mounted in said frame and having means engaging the ribbon at both edges of both strands, a crank connected to said member, and means whereby said crank is driven by the travel of said sheet.

13. A means for ruling lines, said means comprising a roller of yieldable material having ruling rings embedded therein whereby said rings may yield radially of said roller.

14. In a ruling mechanism, a frame having a ruling roller mounted therein at one end thereof and a guide roller mounted therein at the other end thereof, and an endless marking ribbon passing over said rollers, said frame comprising relatively movable parts whereby the size of said frame may be reduced to permit withdrawal of said ribbon.

LESLIE F. CARTER.